June 22, 1926.
G. W. RUGGLES
1,589,903
SAFETY DEVICE AND OPERATING MEANS
Filed April 19, 1924   2 Sheets-Sheet 1
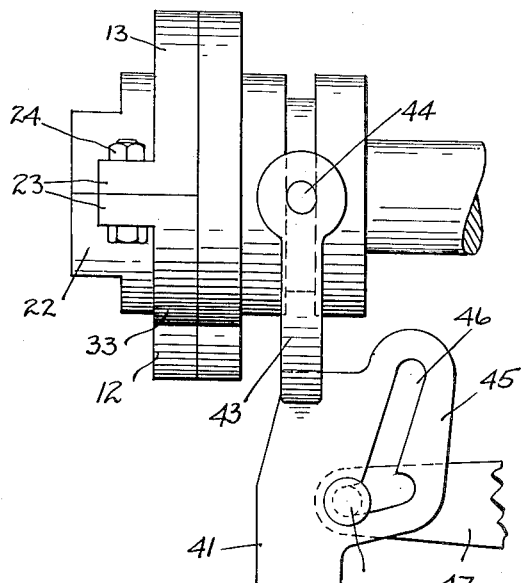
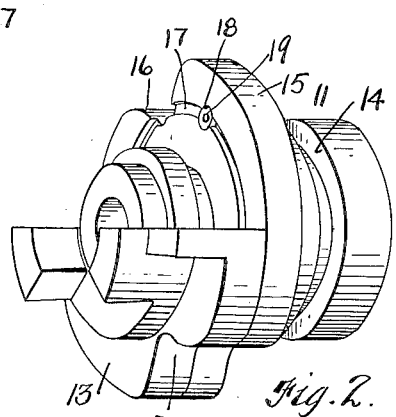
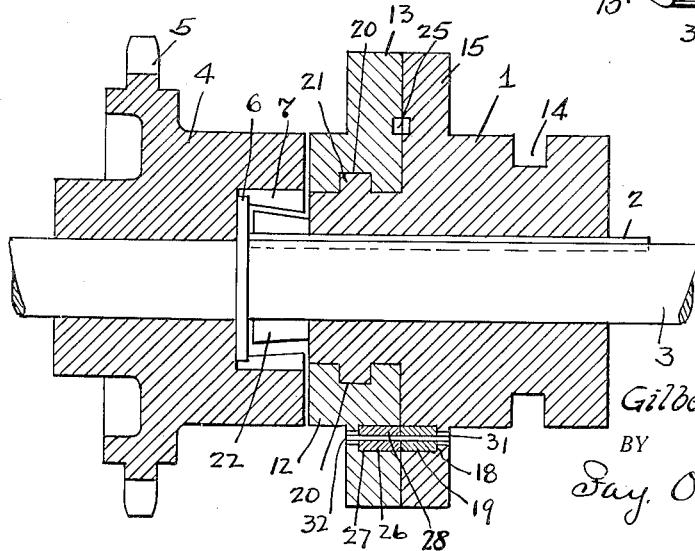
INVENTOR.
Gilbert Wayne Ruggles
BY
Fay, Oberlin & Fay
ATTORNEYS June 22, 1926.

G. W. RUGGLES 1,589,903

SAFETY DEVICE AND OPERATING MEANS

Filed April 19, 1924     2 Sheets-Sheet 2

INVENTOR.
Gilbert Wayne Ruggles
BY
Fay, Oberlin & Fay
ATTORNEYS

Patented June 22, 1926.

1,589,903

UNITED STATES PATENT OFFICE.

GILBERT WAYNE RUGGLES, OF YOUNGSTOWN, OHIO.

SAFETY DEVICE AND OPERATING MEANS.

Application filed April 19, 1924. Serial No. 707,568.

This invention relates to a safety device. More particularly it comprises a safety coupling in a power transmitting mechanism formed by a shear-pin device provided with special features of construction, whereby, after the severing of the pin through the application of an excess of power, there will be no continued transmission of power because of the wedging of the parts, and no injury to the members housing the shear pin.

While the principle of the invention is of broad application, it has been found to be especially valuable in connection with the driving mechanism for automatic stokers. Its application to such use forms the preferred embodiment of the invention herein shown and described. When so applied it permits a most advantageous arrangement of the several parts of the clutch of a stoker mechanism, as well as improved means for operating the same. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but several of various mechanical forms in which the principle of the invention may be used.

In said annexed drawing:—

Figure 4:
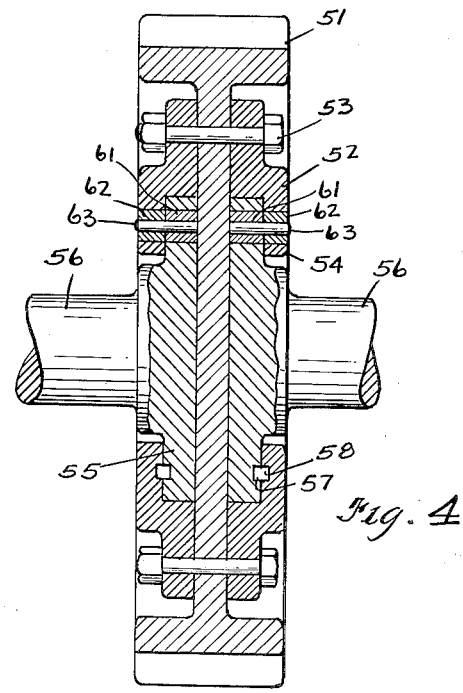
Figure 5:
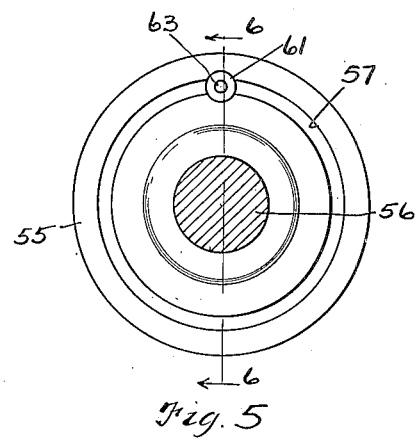
Figure 6:
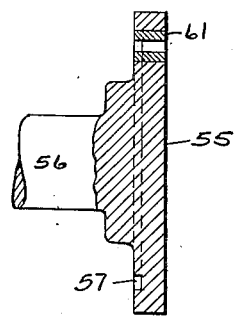

Fig. 1 is a side elevation of the movable clutch member with the shifter lever therefor shown in engaged position; Fig. 2 is a perspective view showing the movable clutch member with the one jaw piece removed therefrom; Fig. 3 is a longitudinal sectional elevation showing all the parts of the clutch mechanism proper with the clutch in engaged position; Fig. 4 is a transverse sectional elevation showing the application of certain features of the invention to a modified form of construction; Fig. 5 is a side elevation of one of the coupling members as shown in Fig. 4; and Fig. 6 is a transverse section taken along the line 6—6 shown in Fig. 5, looking in the direction of the arrows.

The invention, as embodied in an improved form of clutch for an automatic stoker, is clearly shown in Figs. 1 to 3, wherein the clutch comprises a movable member 1, slidable upon a spline 2 rigidly set in the shaft 3, and a second clutch member 4 carrying a sprocket 5 and held against longitudinal movement on said shaft by means of a washer or collar 6 loose upon the shaft and held against movement to the right through contact with the end of the spline. The movable clutch member comprises the main body portion 11 thereof, and two detachable jaw pieces 12, 13. The body portion is provided adjacent its outer end with an annular groove 14 to receive the fingers of a shifter lever, presently to be described. Centrally of the body portion of the movable member an enlarged flange portion 15 is provided, said flange being cut away at diametrically opposite sides 16 sufficiently to intersect a groove 17 formed on the inner face thereof. At an intermediate position, between said cut-away portions, said flange is provided with an enlarged circular recess 18 positioned centrally of said groove and of a diameter slightly larger than the diameter of said groove. Said recess is of somewhat less depth than the thickness of said flange and is adapted to receive a cylindrical bushing 19.

The movable member of the clutch is provided with an extension from said enlarged flange portion, provided with an annular rib 21 upon which movable jaw sections 12, 13, are adapted to be held in rotatable relation with the main body portion of said member through the engagement of an internal recess 20 over said annular rib. Said jaw sections of the movable clutch member are provided at their outer ends with inwardly inclined beveled jaws 22 adapted to be engaged within the jaw members 7 of the clutch member 4. Said jaws are brought into operative relation by shifting the movable member toward the member 4 and are brought into declutching position by shifting the clutch members away from each other. The jaws 22 and 7 are slightly undercut so that they are wider at the end than at the base, so that the clutch members will have a tendency to crowd together. When the movable member is moved out of engagement the washer or collar 6 abuts the end of the spline and prevents the other member moving longitudinally of the shaft. This second clutch member is the driving member operated by a chain over the sprocket and runs idle on the shaft when the clutch members are not engaged.

The removable jaw pieces 12, 13, are provided with laterally projecting ears 23 at either side and are held in seated relation upon the annular rib 21 of the body portion of said member by means of bolts 24. Said jaw pieces 12, 13, when in assembled relation, are provided with an annular groove 25 adapted to register with the groove 17 provided in the flange on the body portion of the movable member and one of said pieces 12 is provided with an annular recess 26 of a size similar to the recess 18 in the body portion of the movable member and adapted to register therewith. A bushing 27 is seated in the recess in said jaw piece and when said recess is brought into registry with the recess 18, a shear pin 28 is inserted through an opening provided centrally of said aligned bushings. In order to provide for the insertion of said shear pin from either side, an opening 31 is provided through the enlarged flange portion of the body of the movable member in alignment with the axis of said bushing, and a similar opening 32 is provided in the flanged portion of the jaw piece 12 in alignment with the axis of the bushing seated therein.

As is clearly shown in the drawing, the jaw pieces are provided with flanged portions of substantially the same outline as the enlarged flange of the body portion of the movable member and have similar cut-away portions 33. The modification shown has no cut-out portion inasmuch as the flanges are readily detachable. Where, however, such detachable flanges cannot be provided cut-out portions similar to Figs. 1 and 2 would be employed.

As is clearly shown in Fig. 1, the shifter lever, employed to move the movable portion of the clutch into and out of active engagement, comprises a body portion 41 having a handle 42 at one end and a pair of upstanding fingers 43 at the other end carrying pins 44 adapted to engage the annular groove 14 formed on the body portion of the movable member. The body portion of the shifter lever is provided with a lateral extension 45 adjacent its upper end, said extension having an inverted T-shaped slot 46. Said lever is adapted to be supported upon a bracket 47, secured to a stationary support adjacent the clutch device and carrying a headed pin 48 which is engaged through said slot.

It will be obvious from the construction shown that when the T-headed portion of the slot is in engagement with the pin that the shifting fingers are in their elevated position so as to ride within the annular groove of the movable member of the clutch and that when said pin is in the base of the T-slot the shifting fingers are wholly removed from contact with the annular groove, thus eliminating all wear and noise which results from clutch shifting levers in constant engagement with the parts.

In Fig. 4 the application of a shear pin to a driven gear 51 is illustrated. Said gear carries a pair of annular flanged members 52 on opposite sides of its central web held in rigid relation thereto by means of a series of bolts 53 secured at intervals through said annular members and said web. The annular members carry overhanging flanges 54 adapted to overlie flanges 55 provided at the ends of shaft members 56. The adjacent faces of the overlapping portions of said flanges and annular members are provided with annular grooves 57, 58, respectively, and at aligned points through said flanges and overlapping extensions and intersecting said grooves enlarged recesses are provided within which bushings 61, 62, are seated. Said bushings are centrally apertured to receive shear pins 63.

As has already been indicated, the clutch device, illustrated in Figs. 1 to 3, is brought into and out of engagement by means of the shifter lever being moved upwardly into engagement with the annular groove and then forced into contact with the headed pin 48 at either end of the slot, depending upon the direction in which the shifting of the movable member is to take place. When said member is moved to the right, as shown in the drawing, the clutch will be disengaged from the member carrying the sprocket, and when moved to the left will be engaged therewith. Should the power applied to the clutch member be higher in amount than the shear pin is designed to withstand, the pin will be sheared and the driving connection of the clutch will thus be released. If the pin does not shear clean, the slot machined in the contacting faces of the extension flanges will allow ample clearance for the pin to turn in after shearing and prevent binding of the clutch sections. The jaw pieces are held to the clutch body by a substantial tongue and groove construction and when the pin is sheared the parts may be revolved with respect to each other until the cut-away portions are brought above the pin sections, when the pin may be backed out. The bushings are of larger diameter than the groove, and the cut-away portions, while permitting the extraction of the pin, will not permit of the removal of the bushings.

In the construction shown in Figs. 4 to 6, the pins, when sheared, will not bind the moving parts and injure the faces of the same, owing to the provision of the grooves affording ample clearance when the shearing of the pin takes place. The pins may be readily renewed and if it is desired to replace the bushings, the annular flanges may be detached to renew the same.

Other modes of applying the principle of my invention may be employed instead of those explained, change being made as regards the mechanism herein disclosed, provided the means stated by any of the following claims or the equivalent of such stated means be employed.

I therefore particularly point out and distinctly claim as my invention:—

1. An article of the character described, comprising a pair of flanged members having contacting faces, an annular groove formed in the face of each member and registering with the groove in the adjacent member, a locking pin seated within apertures in each of said flanged members and extending through the respective grooves in the contacting faces thereof, recesses of greater depth than said grooves formed concentrically of said pins, a pair of annular bushings seated upon each pin within said respective recesses whereby upon application of a shearing stress to the line in which said members are mounted said pin will be sheared to release said members.

2. An article of the character described, comprising a pair of flanged members having contacting faces, an annular groove formed in the face of each member and registering with the groove in the adjacent member, a locking pin seated within apertures in each of said clutch members and extending through the respective grooves in the contacting faces thereof, a pair of annular bushings seated upon said pin within said respective grooves, a cutout portion intersecting the annular grooves of the flanged members at a point adjacent the position of said locking pin whereby when said cutout portions are turned out of registry with each other the sheared sections of said pin may be removed from its associated bushing.

3. A clutch device comprising two relatively movable members having interengaging jaws, the jaw pieces of one of said members being detachable from the body portion thereof, frangible means for holding said jaw pieces in non-rotatable engagement with said body portion, each of said detachable jaw pieces carrying fractional portions of the jaw sections of the clutch on one side thereof and means for engaging said frangible means on the opposite side thereof.

4. A clutch device comprising two relatively movable members having interengaging jaws, the jaw pieces of one of said members being detachable from the body portion thereof, frangible means for holding said jaw pieces in non-rotatable engagement with said body portion, each of said detachable jaw pieces carrying fractional portions of the jaw sections of the clutch on one side thereof and means for engaging said frangible means on the opposite side thereof, and means on said body and detachable jaw pieces permitting the removal of broken sections of said frangible means without disassembling said parts.

5. An article of the character described, comprising a pair of flanged members having contacting faces, an annular groove formed in the face of each member and registering with the groove in the adjacent member, a pair of cylindrical recesses formed in said contacting faces and adapted to be brought into registry with each other said recesses intersecting said annular grooves, a cylindrical bushing seated in each cylindrical recess, a locking pin received within said bushings, and means operable upon the rotation of one of said flanged members to permit removal of the broken sections of said locking pin without releasing said bushings from engagement with their recesses.

Signed by me, this 7th day of April, 1924.

GILBERT WAYNE RUGGLES.